US006687040B2

(12) United States Patent
Kimura

(10) Patent No.: US 6,687,040 B2
(45) Date of Patent: Feb. 3, 2004

(54) LIGHT MODULATING ELEMENT ARRAY AND METHOD OF DRIVING THE LIGHT MODULATING ELEMENT ARRAY

(75) Inventor: Koichi Kimura, Shizuoka (JP)

(73) Assignee: Fuji Photo Film Co., Ltd., Shizuoka (JP)

( * ) Notice: Subject to any disclaimer, the term of this patent is extended or adjusted under 35 U.S.C. 154(b) by 366 days.

(21) Appl. No.: 09/909,884

(22) Filed: Jul. 23, 2001

(65) Prior Publication Data

US 2002/0027536 A1 Mar. 7, 2002

(30) Foreign Application Priority Data

Jul. 21, 2000 (JP) ........................................ 2000-220733

(51) Int. Cl.[7] ................................................ G02B 26/00
(52) U.S. Cl. ........................ 359/290; 359/291; 359/297
(58) Field of Search ................................. 359/290, 297, 359/298, 291; 385/30, 50, 12; 345/48, 84

(56) References Cited

U.S. PATENT DOCUMENTS 6,288,829 B1 * 9/2001 Kimura ...................... 359/291

* cited by examiner

*Primary Examiner*—Georgia Epps
*Assistant Examiner*—M. Hasan
(74) *Attorney, Agent, or Firm*—Young & Thompson

(57) ABSTRACT

A light modulating element array comprises a parallel arrangement of light guides operative to guide light entering in the light guide repeating total reflection, a parallel arrangement of electromechanically deflectable main thin-films partly overlapping the light guides, respectively, and a parallel arrangement of electromechanically deflectable main thin-films disposed perpendicularly to the light guides downstream from the main thin-films. The main thin-films are electromechanically deflected toward the light guide with image signals so as to change transmission rates of light traveling in the light guides, respectively, in synchronism with selective electromechanical deflection of the subsidiary thin-film for line scanning.

15 Claims, 9 Drawing Sheets

LIGHT MODULATING ELEMENT ARRAY AND METHOD OF DRIVING THE LIGHT MODULATING ELEMENT ARRAY

BACKGROUND OF THE INVENTION

1. Field of the Invention

The present invention relates to a light modulating element array which is available as an optical exposure device and a panel display device and, more particularly, to a light modulating element array operative to modulate light traveling in a light guide by electromechanically deflecting a thin-film toward the light guide.

2. Description of the Related Art

There have been various panel display devices such as liquid crystal display devices and plasma display devices on the market. Such a liquid crystal display device has the problem that the utilization efficiency of light is low due to transmission of light from a backlight source through various optical elements including a polarizing plate, transparent electrodes and a color filter. On the other hand, because such a plasma display device needs to have an interstructure for discharge per pixel, there is the problem that it is difficult fort the plasma display device to provide a high luminance and a high efficiency when high definition is required and that the plasma display device needs a high drive voltage. This rises costs of the plasma display device.

In order to solve the problem, there have been proposed panel display devices equipped with electromechanically operated light modulating elements which modulate light from a light source for making an image display. One of such panel display devices is known from, for instance, a paper entitled "Waveguide Panel Display Using Electromechanical Spatial Modulators" published in SID International Symposium Digest of Technical Papers, 1998.

Before describing the present invention in detail, reference is made to FIGS. 14 and 15 showing the panel display device disclosed in that paper for the purpose of providing a brief background of electromechanical Light modulation that will enhance understanding of the light modulating element of the present invention.

As shown in FIG. 14, a panel display device 15 comprises a plurality of strip-shaped light guides 3 arranged in parallel to one another and a plurality of strip-shaped, electromechanically deflectable thin-films 11 arranged in parallel to one another and perpendicularly to the light guides 3. These light guides 3 and electromechanically deflectable thin-films 11 are disposed between a front transparent glass plate 1 and a rear transparent glass plate 13. The light guides are formed directly on the front transparent glass plate 1. However, each of the electromechanically deflectable thin-films 11 is partially connected to and supported by the rear transparent substrate 13 so as to be deflectable toward the light guide 3. An LED array 9 is optically coupled to the light guides 3 through a light guide member 7 equipped with micro-lenses 5. The LED array 9 comprises a straight row of a plurality of LEDs, one per light guide 3. The electromechanically deflectable thin-films 13 thus arranged are operative as optical switches.

As shown in FIG. 15, in operation of the panel display device 15, when selectively applying a drive voltage to electrodes of the electromechanically deflectable thin-films 11, the electromechanically deflectable thin-film 11 deflects and is brought close to the light guide 3 due to electrostatic force. On the other hand, the LEDs of the LED array 9 are energized with image signals in synchronisms with the application of drive voltages to the electrodes of the electromechanically deflectable thin-films 11 to emit light. The light emanating from the LED enters and travels in the light guide 3 repeating total reflection. When the light travels in the light guide 3 to a proximal contact point where the light guide 3 is contacted by the electromechanically deflectable thin-film 11, the light is reflected by a mirror 17 in the electromechanically deflectable thin-film 11 and enters the light guide 3 at a substantially right angle. As a result, the light passes though and comes out of the light guide 3 at the proximal contact point. On the other hand, when the drive voltage is removed, the electromechanically deflectable thin-film 11 is restored to its original state and provides a gap between the light guide 3 and the electromechanically deflectable thin-film 11, so that the light travels in the light guide 3 without coming out of the light guide 3 and entering the electromechanically deflectable thin-film 11.

The panel display device 15 employs the electromechanically deflectable thin-film 11 that can operate quickly responding to application of drive voltage. This makes the panel display device 15 operate with high responsiveness. Further, the panel display device 15 does not employ a number of layers through which light passes like the conventional liquid crystal display panels nor have the necessity of vacuum-sealing electrode arrays like the plasma display panels. This realizes manufacturing costs of the panel display device 15.

The conventional panel display device makes a two dimensional display by making a line display by applying drive voltage to one of the electromechanically deflectable thin-films and introducing light modulated according to image signals into the light guides in synchronism with the application of voltage to the electromechanically deflectable thin-film and shifting application of drive voltage to the electromechanically deflectable thin-films from one to another. In order for the conventional panel display device to make an animated color display in HDTV (high definition television) system which has 1080 scanning lines and a frame frequency of 60 Hz, it is essential to employ an LED array which is operative to modulate light at a high frequency less than 16 $\mu$s. For this reason, it is one of drawbacks that the conventional panel display device can not employ a fluorescent lamp that is inexpensive and efficient. In addition, the conventional panel display device has the necessity to have the same number of LEDs as the light guides. Accordingly, when making a color display in HDTV system, the number of image signals is 1920 for a mono-color line display, and hence, 5760 for a color line display. This makes an image signaling circuit complex and the LED array expensive. In addition, this results in the necessity of precise positioning technique in order to optically couple the LED array to the light guides and provides a rise in manufacturing and assembling costs of the LED array and the light guides.

SUMMARY OF THE INVENTION

It is therefore an object of the present invention to provide a light modulating element array which does not need an array of light source elements nor has the necessity to modulate light at a high speed.

It is another object of the present invention to provide a light modulating element array simple in structure and unnecessary to use a precise positioning skill which results in a decrease in manufacturing and assembling costs of light source and the light guides.

It is still another object of the present invention to provide a panel display device equipped with a light modulating element array which is simple in structure and manufactured at low costs.

The foregoing objects are accomplished by providing a light modulating element array comprising a grid arrangement of stripe-shaped light guides, such as optical wave guides or light guide plates, for guiding light entering there so that the light travels in the light guide repeating total reflection at opposite interfaces of the light guide and strip-shaped electromechanically deflectable subsidiary thin-films disposed such as to face the light guides, respectively, at a specified regular distances from the interface of the respective light guides, and strip-shaped electromechanically deflectable main thin-films each of which extends in a direction in which the light travels in the light guide and is disposed such as to face the light guide before the subsidiary thin-film at a specified regular distance from the interface of the light guide. When the main thin-film is electromechanically deflected to be brought close to the interface of the light guide means, the light guide means changes a transmission rate of light traveling therein. On the other hand, when the subsidiary thin-film is electromechanically deflected to be brought into contact with the light guide means, the light traveling in the light guide means comes out of the light guide means and passes through the subsidiary thin-film at a point where the light guide means is contacted by the subsidiary thin-film. In the light modulating element array thus driven, the light that travels in the light guide means is changed in transmission rate by electromechanically deflecting the main thin-film while the light source remains turned on, so that the light traveling in the light guide means is modulated at a high speed. This avoids the necessity of modulating a light source and employment of an array of light source elements.

More specifically, the light modulating element array comprises a parallel arrangement of strip-shaped light guides and a parallel arrangement of strip-shaped electromechanically deflectable subsidiary thin-films which spatially intersect each other at a right angle and strip-shaped electromechanically deflectable main thin-films disposed such that one main thin-film spatially overlaps each light guide in front of the strip-shaped subsidiary thin-film. This arrangement of the light guides and the subsidiary thin-films provides an orthogonal matrix of light spots that are modulated by electromechanical action of the main thin-films. This avoids the necessity of providing the same number of light source elements as the light guides and controlling a large number of light source elements to independently and selectively turn on, as a result of which the driving circuit of the light modulating element array is simplified in structure In addition, this avoids the necessity of employing an array of light source elements, as a result of which there is no necessity of precisely positioning and optically coupling the parallel arrangement of light guides and the light source elements, respectively.

Each of these main thin-film, subsidiary thin-film and light guide may be provided with a transparent electrode. The electromechanical action of the main thin-film is caused by electrostatic force generated under application of a potential difference between the electrodes of the light guide and the main thin-film. Similarly, the electromechanical action of the subsidiary thin-film is caused by electrostatic force generated under application of a potential difference between the electrodes of the light guide and the subsidiary thin-film.

The main thin-film may contain light absorbing means for absorbing light entering the main thin-film. When the main thin-film is brought into contact with or close to the light guide, the main thin-film absorbs light entering from the light guide and prevents the light from coming out of the main thin-film, so that the transmission rate of light traveling in the light guide is certainly changed. Otherwise, the main thin-film may be accompanied by light reflective means for reflecting light entering the main thin-film so that the reflected light comes out of the main thin-film and enters the light guide at a right angle. When the main thin-film is brought into contact with or close to the light guide, the reflective means reflects light passing through the main thin-film back to the main thin-film The light enters again the main thin-film at a right angle and passes though the main thin-film. Then the light enters the light guide at a right angle and passes though the light guide. As a result, the transmission rate of light traveling in the light guide is certainly changed.

A plurality of the main thin-films may be arranged in a straight row per each light guide such as to be deflected independently from one another. This can increasingly change the amount of light coming out of the light guide and entering the main thin-films by increasing the number of main thin-films that are deflected, so that the transmission rate of light traveling in the light guide changes in steps.

The fluorescent means for producing different colors of fluorescence, namely red green and blue fluorescence, may be provided such as to be excited by light coming out of the subsidiary thin-film. The light modulating element array equipped with the fluorescent means can make any desired color display with a single mono color light source. Otherwise, different color filters for transmitting specific colors of light, respectively, may be disposed such as to selectively transmit the specific colors of light coming out of the subsidiary thin-film, respectively. The light modulating element array equipped with the color filters can make any desired color display with a single mono color light source such as a white light source.

The light modulating element array may further comprises main thin-film accompanied by light reflective means for reflecting back light entering the main thin-film and fluorescent means or color filters on one side of the light guide opposite to the side on which the main and subsidiary thin-films are disposed so that the reflected light comes out of the main thin-film and enters the light guide at a right angle. According to the light modulating element array, when the subsidiary thin-film is brought into contact with the light guide, light traveling in the light guide to a point where the subsidiary thin-film is in contact with the light guide comes out of the light guide and enters the subsidiary thin-film. Then the light is reflected back by the reflective means, enters the light guide at a right angle and passes through the light guide. The light coming out of the light guide excites the fluorescent means or passes through the color filter. The light modulating element array can make any desired color display with a single mono color light source and allows the fluorescent means or the color filters as an integral part of the light guide.

In the case where the light modulating element array is used as a panel display device, light source means is disposed in a specified positional relation to the light guide so that light emanating from the light source and entering the light guide impinges the interface of the light guide at an angle greater than the critical angle of total reflection. In order for the panel display device to make a color display, the light source means may comprises three primary colors of light sources arranged side by side or may be a single mono-color light source when the subsidiary thin-film is accompanied by the fluorescent means or the color filter.

BRIEF DESCRIPTION OF THE DRAWINGS

The above and other objects and features of the present invention will be clearly understood from the following description with respect to the preferred embodiment thereof when considered in conjunction with the accompanying drawings, wherein the same reference numerals have been used to denote the same or similar parts or elements, and in which.

DETAILED DESCRIPTION OF THE PREFERRED EMBODIMENTS

Figure 1:
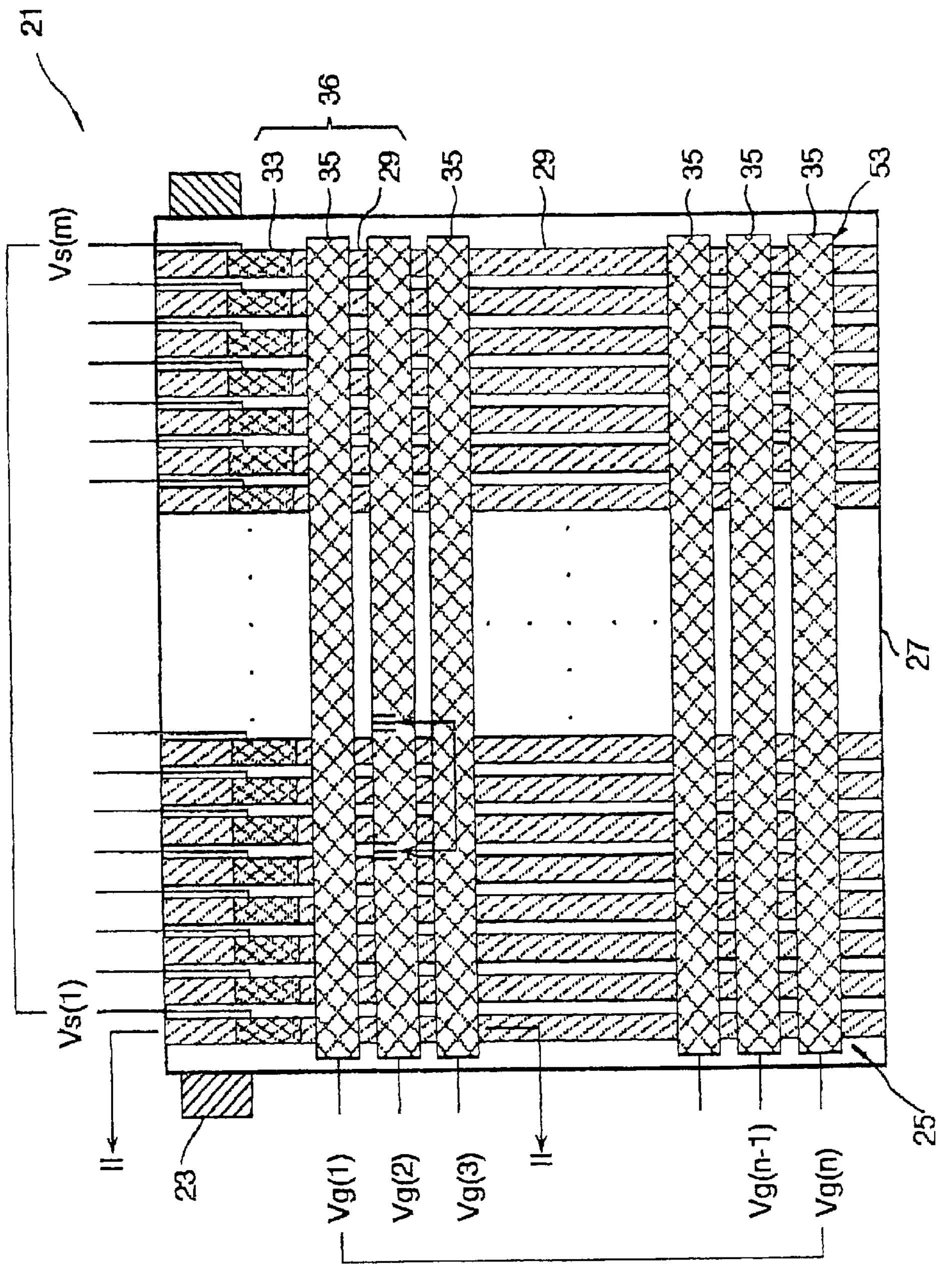
FIG. 1 is a plan view showing a panel display device in accordance with an embodiment of the present invention.
Figure 2:
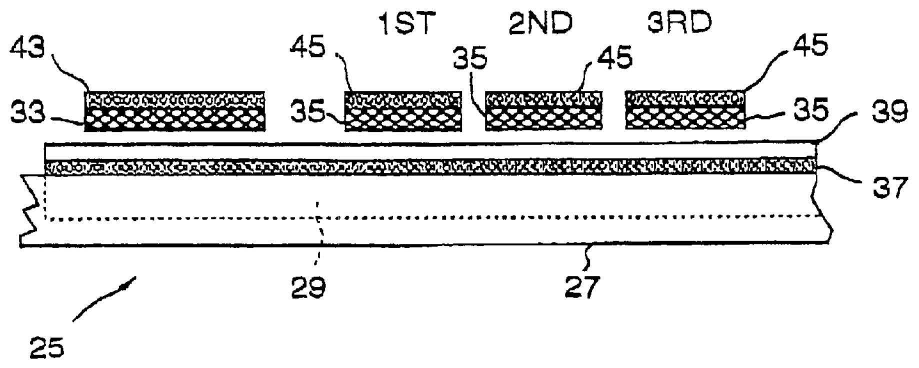
FIG. 2 is a cross-sectional view taken along line II—II of FIG. 1.
Figure 3:
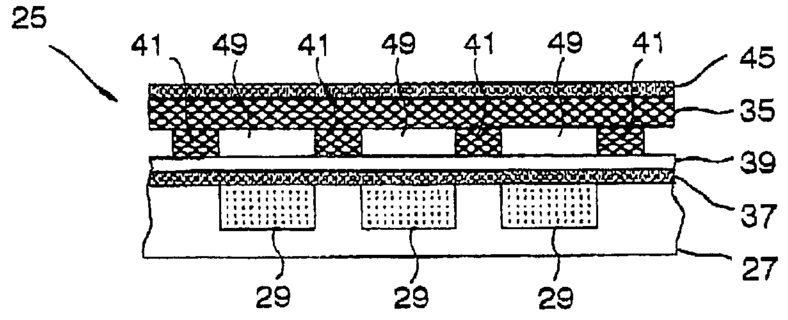
FIG. 3 is a cross-sectional view taken along line III—III of FIG. 1.
Figure 4:
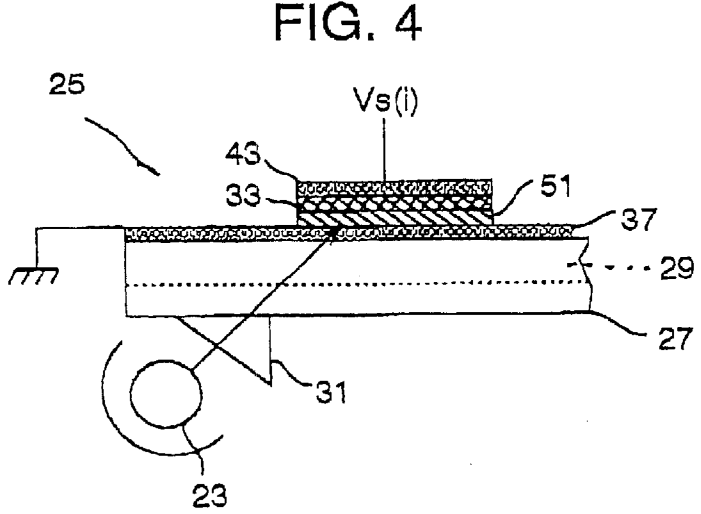
FIG. 4 is an enlarged view of a portion including an electromechanically deflectable main thin-film of the panel display device.

Referring to the drawings in detail, and in particular, FIGS. 1 to 4 show a panel display device 21 according to a desired embodiment of the present invention. As schematically shown in FIG. 1, the panel display device 21 comprises a plate type of light modulating element array 25 disposed on a transparent base substrate 27 such as a glass plate and a line light source such as a fluorescent lamp 23 disposed on the back side of the transparent base substrate 27. The light modulating element array 25 comprises a plurality of strip-shaped light guides 29, such as waveguides or light guide plates, formed in parallel to one another on the transparent base substrate 27. The fluorescent lamp 23 is disposed in close proximity to ends of the light guides 29 on one side of the transparent base substrate 27 opposite to the other side where the light modulating element array 25 is disposed such that it extends in a direction perpendicular to the light guides 29. Fluorescent rays emanating from the fluorescent lamp 23 enter the respective light guides 29 passing through an optical element 31 installed to the transparent base substrate 27 at the back side as shown in FIG. 4. The light having entered the light guide 29 once travels in the light guide 29 repeating total reflection at the interfaces of the light guide 29. There is a parallel arrangement of strip-shaped electromechanically deflectable main thin-films 33 on the transparent base substrate 27. Each main thin-film 33 extends in a direction in which the light guide 29 extends such as to spatially overlap a from portion of the light guide 29 and is suspended at a specified distance from the interface of the light guide 29 by a spacer (not shown) on the transparent base substrate 27. Further, there is a parallel arrangement of strip-shaped electromechanically deflectable subsidiary thin-films 35 over the light guides 29. Each subsidiary thin-film 35 extends perpendicularly to the light guides 29 such as to spatially intersect to the light guides 29 and is suspended at a specified distance from the interface of the light guide 29 by a spacer (not shown) on the transparent base substrate 27. That is to say, the light guides 29 and the subsidiary thin-films 35 are arranged in a grade pattern to form a dot matrix of intersection points. These light guide 29, main thin-film 33 and subsidiary thin-film 35 form a light modulating element 36. The suspended structure of these main thin-films 33 and subsidiary thin-films 35 will be described in detail later.

As shown in FIG. 2, there is a first transparent electrode 37 formed on the entire area of transparent base substrate 27. This transparent electrode 37 is made of a metal oxide such as indium tin oxide (ITO) having high electron density, an ultra thin metal film such as an aluminum film, a thin-film metal comprising fine-grain metal dispersed in transparent insulating material, high density-doped wide-band gap semiconductor.

As shown in FIG. 3, there is one spacer 41 extending between each adjacent light guides 29 on an insulation layer 39 formed over the transparent electrode 37. The spacer 41 my be made of, for example, silicon oxides, silicone nitrides, ceramics, resins and the like. The subsidiary thin-film 35 is supported by the spacers 41 arranged at regular distances so as to form a cavity or air gap 49 below the subsidiary thin-film 35 between each adjacent spacers 41. Although not shown in FIG. 2, the main thin-film 33 is also supported by the spacers so as to form a cavity or air gap below the main thin-film 33 between the spacers.

Each of the main thin-films 33 and subsidiary thin-films 35 is basically formed of a transparent conductive material such as polysilicon semi-conductors, insulating silicon oxides, silicon nitrides ceramics, resin, metals and the like The main thin-film 33 at its light incident side is formed with a second transparent electrode 43. The subsidiary thin-film 35 at its light exit side is formed with a third transparent electrode 45. The insulation layer 39 can be omitted as long as the first transparent electrodes 37 are prevented from being mechanically contacted by the second and third transparent electrodes 43 and 45. The first to third transparent electrodes 37, 43 and 45 may be made of the same material. The spacers 41 may be made of the same material as the main thin-films 33 and subsidiary thin-films 35. Each of the main thin-films 33 and the subsidiary thin-films 35 itself can be an electrode. The second electrode 43 may be formed on either surface of the main thin-films 33. Similarly, the third electrode 45 may be formed on either surface of the subsidiary thin-films 35.

As described above, each adjacent spacers 41 provide the cavities or air gaps 49 below the main thin-films 33 and the subsidiary thin-films 35. The depth of the air gap 49, which depends upon the height of the spacer 41, is desirable to be, for example, between approximately 0.1 μm and approximately 10 μm. The air gap 49 is practically formed by the use of a sacrifice layer 61 (see FIG. 5).

In practical measurements of the light modulating element array 25, the air gap 49 has a width ranging from approximately 1 μm, to 2 μm, and each of the main thin-films 33 and the subsidiary thin-films 35 has a film thickness ranging approximately 1 μm, to several microns, a width ranging a few microns to tens microns and a length ranging several tens microns to hundreds microns.

As shown in FIG. 4, the main thin-film 33 at the light incident side is formed with a light absorption layer 51. This light absorption layer 51 operates to absorb light incident thereupon and to confine it therein. The main thin-film 33 at the light incident side may be formed with a light polarization layer in place of the light absorption layer 51.

The light modulating element array 25 provides a two-dimensional, dot matrix of intersection points 53 of the light guides and the subsidiary thin-films which are points at which light traveling in the light guide 29 deflects its path so as to enter the subsidiary thin-film 35 and come out of the subsidiary thin-film 35 while the light guide 29 remains contacted by the subsidiary thin-film 35 as will be described later. The intersection point 53 is hereafter referred to light path deflection point or light emitting point.

The following description will be directed to a process of producing the light modulating element array 25 on the base substrate 27.

Figure 5:
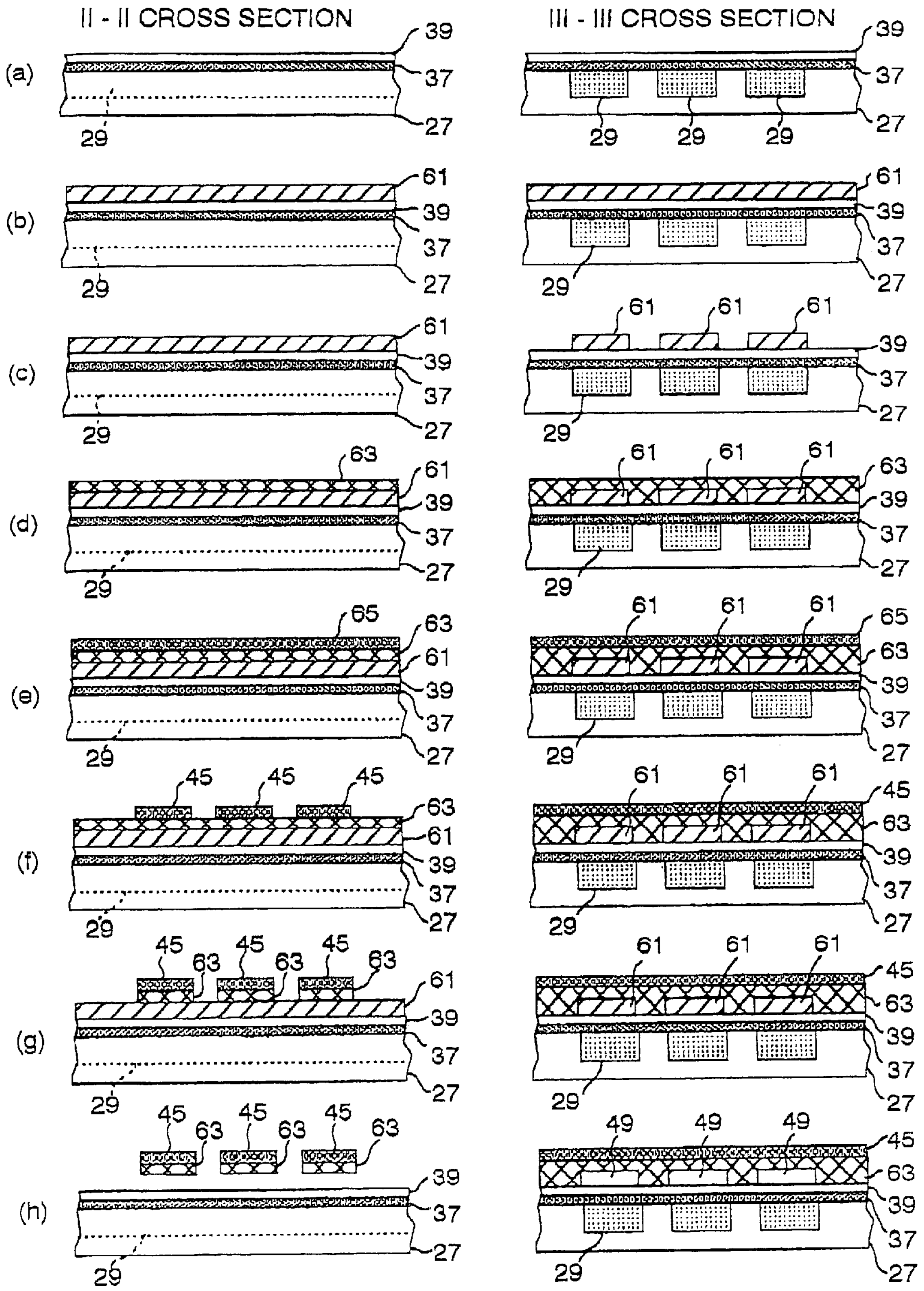
FIG. 5 shows a process of forming a light modulating element array of the panel display device.

FIG. 5 schematically shows a process of forming the light modulating element array 25 on the base substrate 27 which comprises steps (a) through (h). As shown, in the first step (a), a first transparent electrode 37 and an insulation layer 39 are formed in this order over the transparent base substrate 27 formed with a parallel arrangement of light guides 29 on the base substrate 27. After forming a sacrifice layer 61 over the insulation layer 39 in step (b), the sacrifice layer 61 is patterned in conformity with an intended arrangement of air gaps in step (c). Subsequently, in step (d), a thin-film layer 63 is formed over the sacrifice layer 61 so as to cover the entire area of the transparent base substrate 27. Strip-shaped electromechanically deflectable main and subsidiary thin-films 33 and 35 and spacers 41 are formed from this thin-film layer 63 in a later step. In step (e), a layer 65 for second and third transparent electrodes 43 and 45 is formed over the thin-film layer 63. This layer 65 is patterned to leave parallel arrangements of second and third transparent electrodes 43 and 45 that are in conformity with intended arrangements of the main and subsidiary thin-films 33 and 35 in step (f). The second transparent electrode 43 is hidden in step (f).

Thereafter, in step (g), the thin-film layer 63 is patterned by using the second and third transparent electrodes 43 and 45 as a patterning mask so as to leave a parallel arrangement of the main and subsidiary thin-films 33 and 35 on spacers 41 in conformity with the arrangement of the second and third transparent electrodes 43 and 45. Finally, in step (h), the sacrifice layer 61 is removed to form the cavities 49. Through these steps, the light modulating element array 25 is completed with the main and subsidiary thin-films 33 and 35 suspended on the transparent base substrate 27.

In operation of the light modulating element array 25 used as a panel display device, the principle of light modulation by the light modulating element 36 is such that total reflection and optical proximity effect are caused for the light incident upon the light modulating element 36 by bringing the main thin-films 33 or the subsidiary thin-films 35 into contact with and separation from the light guide 29 due to electromechanical action. Specifically, the light incident upon the light modulating element 36 travels in the light guide 29 repeating total reflection at the interfaces of the light guide 29 while the main thin-film 33 or the subsidiary thin-film 35 remains separated from the light guide 29, that is to say, while there is a cavity 49 left between the main thin-films 33 or the subsidiary thin-films 35 and the light guide 29, so as to be prevented from coming out of the light modulating element 36. On the other hand, the light incident upon the light modulating element 36 enters the main thin-films 33 or the subsidiary thin-films 35 through the light guide 29 while the main thin-films 33 or the subsidiary thin-films 35 is in contact with the light guide 29, so as to come out from the light modulating element 36.

While the main thin-film 33 remains in contact with the light guide 29 as shown in FIG. 4, the light guide 29 changes the transmission rate of light downstream from the contact point with main thin-film 33. In other words, the light guide 29 prevents the light from traveling in the light guide 29 beyond the contact point with main thin-film 33 or significantly reduces the light in quantity that travels in the light guide 29 beyond the contact point with main thin-film 33. On the other hand, while one of the subsidiary thin-films 35 remains in contact with the light guide 29, the light guide 29 permits the light to pass through the interface thereof at the contact point with the subsidiary thin-film 35 and to enter the subsidiary thin-film 35 due to the optical proximity effect. As a result, the light coming out of the light modulating element 36 is modulated.

Figure 6A:
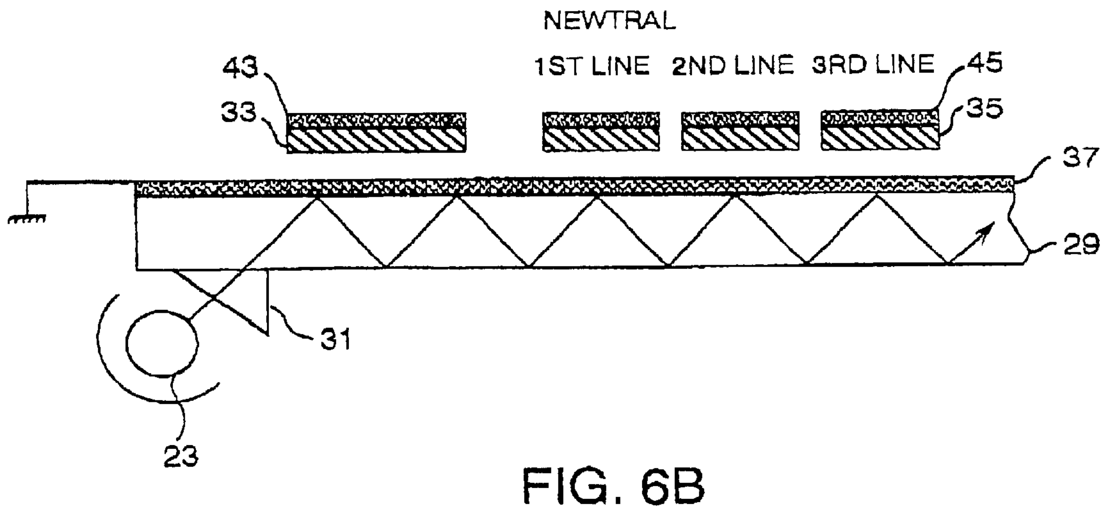
FIGS. 6(A)–6(C) are illustrations explaining a principle of electromechanical action of a light modulating element of the panel display device.
Figure 6B:
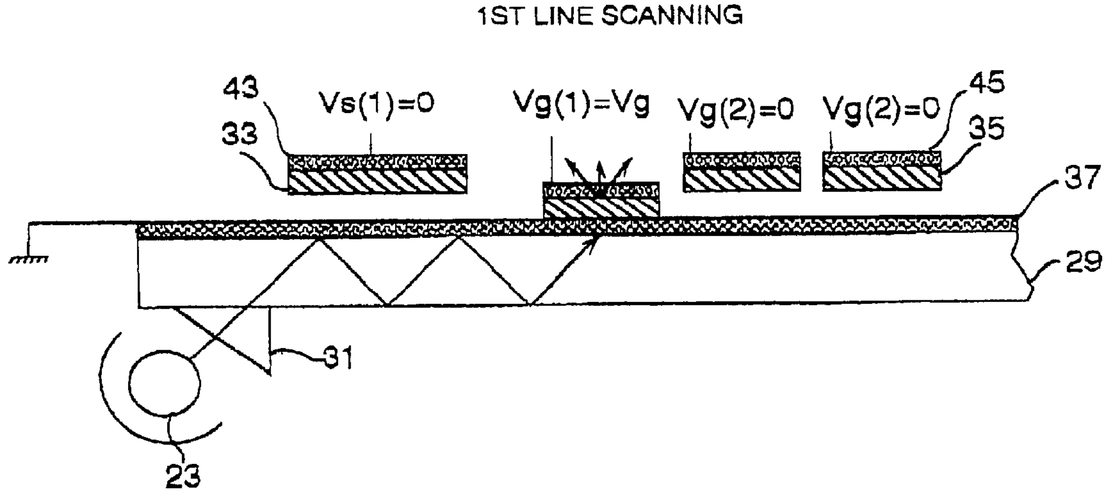
Figure 6C:
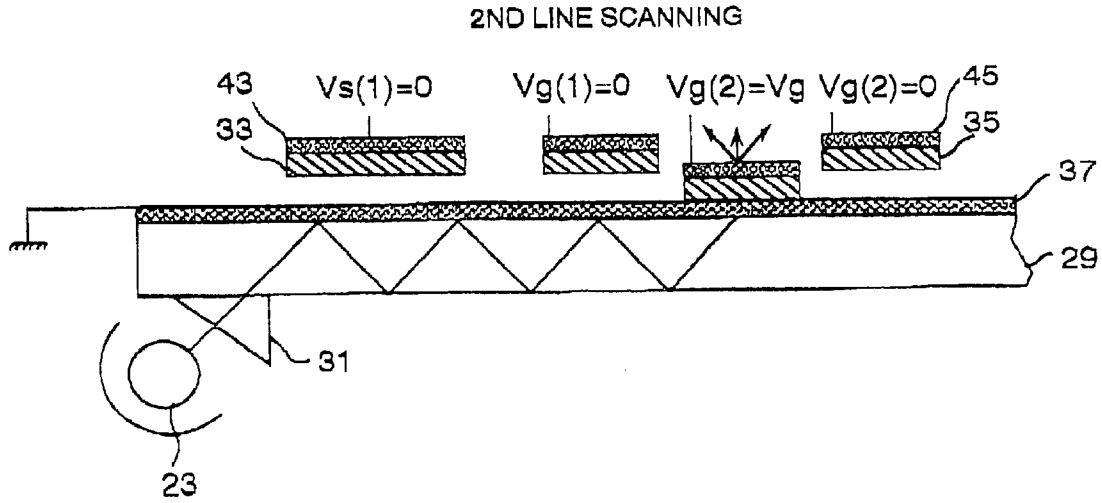

As shown in FIGS. 6(A) to 6(C) in more detail, in the event where there is a cavity 49 left between the subsidiary thin-film 35 and the light guide 29 while there is no potential difference between the first and third transparent electrodes 37 and 45, for example while both first and third transparent electrodes 37 and 45 are at, for example, a potential of 0 (zero) V, the critical angle of total reflection θc at the interface of the light guide 29 to air is given by the following equation:

$$\theta c = \sin^{-1}(nw)$$

where nw is the refractivity of the light guide 29.

Light enters the light guide 29 and impinges against the interfaces of the light guide 29 at an angle a θ greater than θc, the light travels in the light guide 29 repeating total reflection.

On the other hand, in the event while the subsidiary thin-film 35 is brought into contact or substantially contact with the light guide 29 due to electrostatic attractive force that is caused by a potential difference between the first and third transparent electrodes 37 and 45, although light enters the light guide 29 and impinges against the interfaces of the light guide 29 at an angle θ greater than θc, the light passes through the interface of the light guide 29 and the subsidiary thin-film 35 and then comes out from the subsidiary thin-film 35.

In driving the panel display device 21 equipped with the light modulating element array 25, image signals Vs(1) to Vs(m) are applied to the second transparent electrodes 43 of the main thin-films 33, respectively. Scanning signals Vg(1) to Vg(n) are applied to the third transparent electrodes 45 of the subsidiary thin-films 35, respectively. In a neutral state where there is no image signals Vs applied to the transparent second electrodes 43 of the main thin-films 33 nor drive signals Vg applied to the third transparent electrodes 45 of the subsidiary thin-films 35 as shown in FIG. 6, fluorescent light emanating from the fluorescent lamp 23 and entering the light guide 29 through the optical element 31 travels in the light guide 29 repeating total reflection at the interfaces and, in consequence, does not come out of the light guide 29. When scanning a first row of one field, a drive signal Vg(1) is applied to the first subsidiary thin-film 35 so as to bring the subsidiary thin-film 35 into contact with the light guides 29, thereby forcing the light to come out from the first subsidiary thin-films 35 at the first row of light path deflection points 53. Similarly, when scanning a second row of the field, a drive signal Vg(2) is applied to the second subsidiary thin-film 35 so as to bring the second subsidiary thin-films 35 into contact with the light guides 29, thereby forcing the light to come out from the subsidiary thin-films 35 at the second row of light path deflection points 53. In synchronism with scanning the subsidiary thin-films 35, the main thin-films 33 are driven with image signals Vs(i), respectively.

Figure 7:
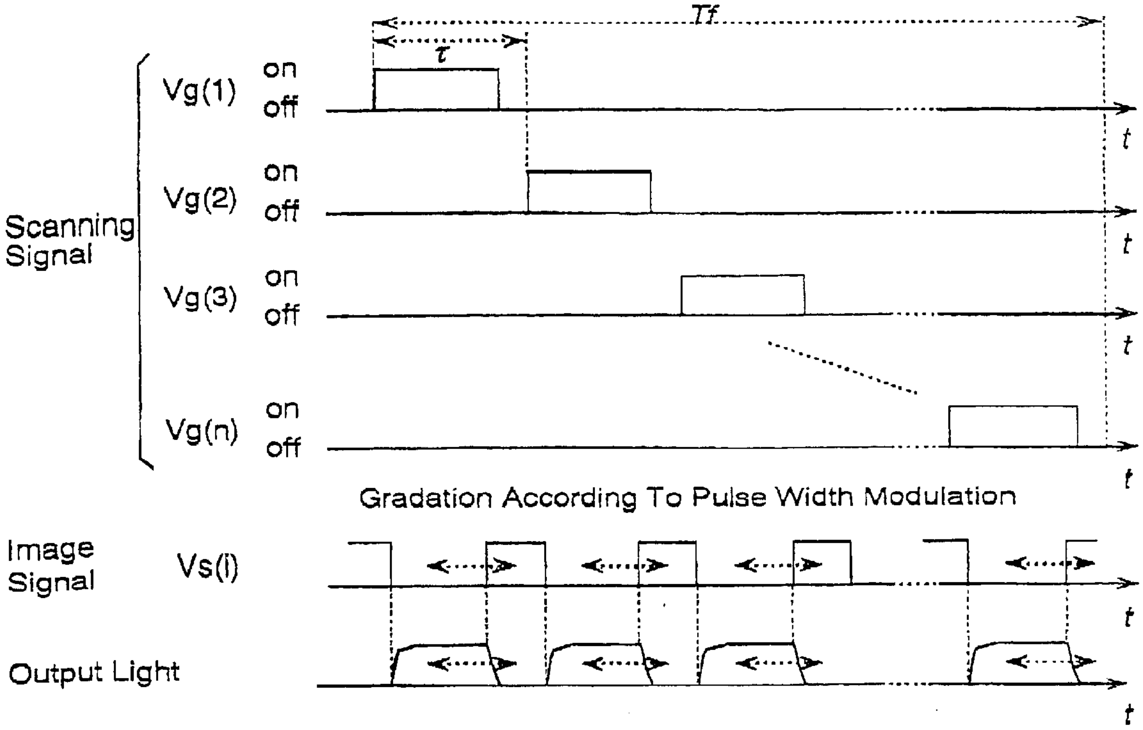
FIG. 7 is a time chart showing drive sequence of the panel display device.

The sequential drive control of the panel display device 21 will be hereafter described in detail with reference to FIG. 7. The panel display device 21 is scanned on a field period Tf with scanning signals Vg(i) in line sequential on a scanning period $\tau$. While there is no image signal Vs(i) applied to a second transparent electrode 43 of the i-th main thin-film 33, the i-th light guide 29 is not contacted by the i-th main thin-film 33, so that the i-th light guide 29 allows light to travel therein. Therefore, when applying a scanning signal Vg to the third transparent electrode 45 of the subsidiary thin-film 35 in order from the first to the n-th, the light modulating element array 25 causes light to travel in the light guide 29 to the light path deflection point 53 that the scanning signal Vg is applied, so that the light comes out from of the main thin-film 33 at the light path deflection point 53 in order from the first to the n-th, thereby displaying an image. This sequential control enables the panel display device 21 to display a full color image and also enables the light source to operate stably due to non-TFT, simple line sequential scanning (scanning in simple line sequential of the light modulating element array 25 without using TFT as an active element) and electrostatic driving of the light modulating element array 25. Further, this sequential control provides improved mobility of dynamic picture image. In the case where the field period Tf is 17 ms and the number of scanning lines is 1000 per field, the scanning period $\tau$ of 17 $\mu$s or less is satisfied.

According to the line sequential drive, the light modulating element array 25 can modulate light traveling in the light guides 29 at a high speed by electromechanically actuating the main thin-films 33 while the fluorescent lamp 23 remains turned on. This leads to high speed optical modulation and utilization of an inexpensive light source that is unnecessary to be arrayed. Furthermore, there is no necessity for the light modulating element array 25 to be provided with the same number of light sources as the light guides 29 such that the light sources are independently turned on from one another. This leads to a simple drive circuit. In addition, there is no necessity for the light modulating element array 25 to be provided with an arrayed arrangement of light sources that is at least optically coupled to the light guides 29, so that it is not necessary to precisely align the light sources with the light guides 29, respectively. This avoids the necessity of precise positioning technique in assembling the light modulating element array 25 and makes it possible to form the light modulating element array 25 at low costs.

The panel display device 21 described above can be available as an exposure device for making exposure, in particular digital multi-exposure, to a photosensitive material. Such a digital multi-exposure device is satisfactorily used in an image recording apparatuses such as high speed printers. Conventionally, since a printer equipped with an exposure device makes exposure to a fixed area in a specified exposure time, relative movement must not occur between the exposure device and an original whose image is printed. As compared with the conventional printer, the panel display device 21 as used as an exposure device can perform digital multi-exposure by selectively driving thin-films formed in a pattern correspondingly to a matrix electrode. This digital multi-exposure enables line control causing relative movement between the exposure device and an original whose image is printed, resulting in high speed exposure and significantly improved high speed printing. The panel display device 21 as used as an exposure device can be utilized in a so-called digital direct color proof (DDCP) printing that is one of complex technologies of, for example, an electronic photographic technology and an offset printing technology and in a so-called computer-to-plate (CTP) printing.

Figure 8:
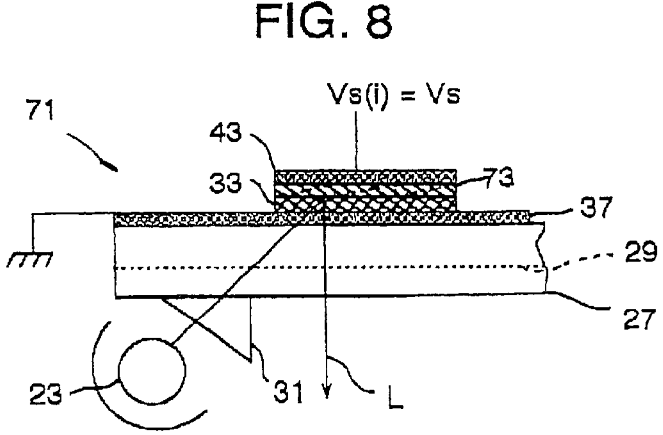
FIG. 8 is an enlarged view of a portion including an electromechanically deflectable main thin-film of a panel display device in accordance with another embodiment of the present invention.

FIG. 8 shows essential part of a panel display device as used as an exposure device in accordance with another preferred embodiment of the present invention. A light modulating element array of the panel display device schematically indicated by a numeral 71 is similar to the light modulating element array 25 shown in FIG. 1 but different in that a main thin-film 33 for each light guide 29 is formed with a reflective layer 73 coated thereon which reflects light coming out of the light guide 29. When the main thin-film 33 is actuated and brought into substantive contact with the light guide 29, the light traveling in the light guide 29 enters the main thin-films 33 and then is reflected by the reflective layer 73. When the reflected light L from the reflective layer 73 is directed at a right angle to the light guide 29, and hence the transparent base substrate 27, it passes through the light guide 29 and the transparent base substrate 27. As the result of this, the light guide 29 changes the transmission rate of light downstream from the contact point with the main thin-film 33.

According to the light modulating element array 71, light that has entered the main thin-film 33 once is reflected by the reflection layer 73 and then comes out of the transparent base substrate 27, and hence the light modulating element array 71. This provides only a small rise in temperature of the main thin-film 33 as compared with the main thin-film 33 with light absorption layer 51 as shown in FIG. 4.

Figure 9:
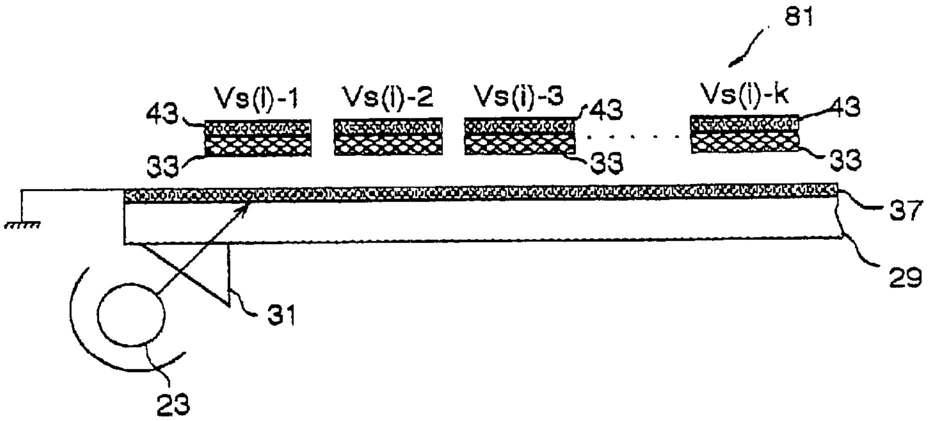
FIG. 9 is an enlarged view of a portion including an electromechanically deflectable main thin-film of a panel display device in accordance with another embodiment of the present invention.

FIG. 9 shows a panel display device, which is depicted in cross-section taken in a direction perpendicular to subsidiary thin-films, in accordance another preferred embodiment of the present invention. A light modulating element array 81 of the panel display device is similar to the light modulating element array 25 shown in FIG. 1 but different in that a plurality of main thin-films 33 are formed, in place of a single main thin-films 33, for each light guide 29. The light modulating element array 81 comprises a plurality of main thin-films 33 arranged in a straight row in a direction in which light travels in the light guide 29. These main thin-films 33 are independently actuated. When selectively actuating the main thin-films 33 one or in combinations, the light modulating element array 81 changes the transmission rate of light that travels in the light guide 29 in steps In the light modulating element array 81, a specified quantity of light traveling in the light guide 29 can be reduced in quantity in steps according to a number of main thin-films 33 that are selectively actuated and/or a combination pattern of main thin-films 33 that are selectively actuated. In the case, for example, where eight main thin-films 33 are provided, the light modulating element array 81 can change the quantity of light traveling in the digital eight-bits steps.

Figure 10:
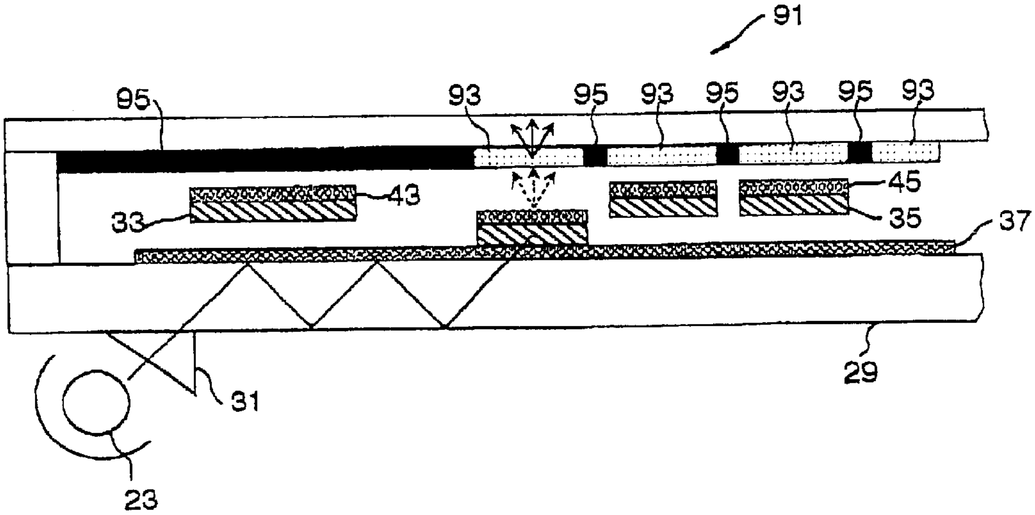
FIG. 10 is an enlarged view of a portion including an electromechanically deflectable main thin-film of a panel display device in accordance with another embodiment of the present invention.

FIG. 10 shows a panel display device, which is depicted in cross-section taken in a direction perpendicular to subsidiary thin-films, in accordance another preferred embodiment of the present invention. A light modulating element array 91 of the panel display device is similar to the light modulating element array 25 shown in FIG. 1 but different in that the light modulating element array 91 has fluorescent thin-film layers 93 one for each subsidiary thin-film 35 above the subsidiary thin-films 35. Each adjacent fluorescent thin-film layers 93 are separated and optically shielded from each other by a black masking layer 95. The fluorescent thin-film layer 93 is excited by light coming out of the actuated subsidiary thin-film 35 to emanate scattered fluorescence. The optically shielded structure of the fluorescent thin-film layers 93 improves contrast of the light modulating element array 91.

According to the light modulating element array 91, it can be enabled to provide any desired wavelength of light by using a single mono-color light source such as an ultra-violet light source when the panel display device employs a light modulating element array 91 with fluorescent thin-film layers 93 different in color. This results in providing any specific wavelengths of light at the light path deflection points 53 on a simple panel display device.

Figure 11:
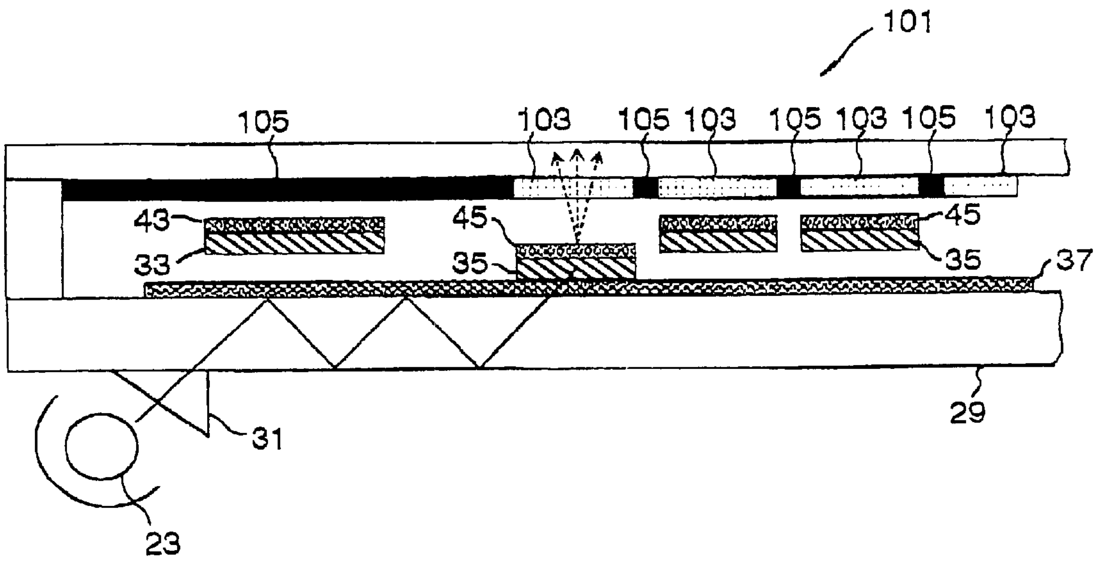
FIG. 11 is an enlarged view of a portion including an electromechanically deflectable main thin-film of a panel display device in accordance with another embodiment of the present invention.

FIG. 11 shows a panel display device, which is depicted in cross-section taken in a direction perpendicular to subsidiary thin-films, in accordance another preferred embodiment of the present invention. A light modulating element array 101 of the panel display device is similar to the light modulating element array 91 shown in FIG. 10 but different in that the light modulating element array 101 has color filter layers 103 for selective transmission of a specific wavelength of light, one for each subsidiary thin-film 35, in place of the fluorescent thin-film layers 93 of the light modulating element array 91 shown in FIG. 10. Each adjacent color filter layers 103 are separated and optically shielded from each other by a black masking layer 105. The color filter layer 103 selectively transmits light coming out of the subsidiary thin-film 35 so that the specific wavelength of scattered light comes out of the color filter layer 103 at each light path deflection point 53.

According to the light modulating element array 101, it can be enabled to provide any desired wavelength of light at each light path deflection point 53 by using even a white light source.

Figure 12:
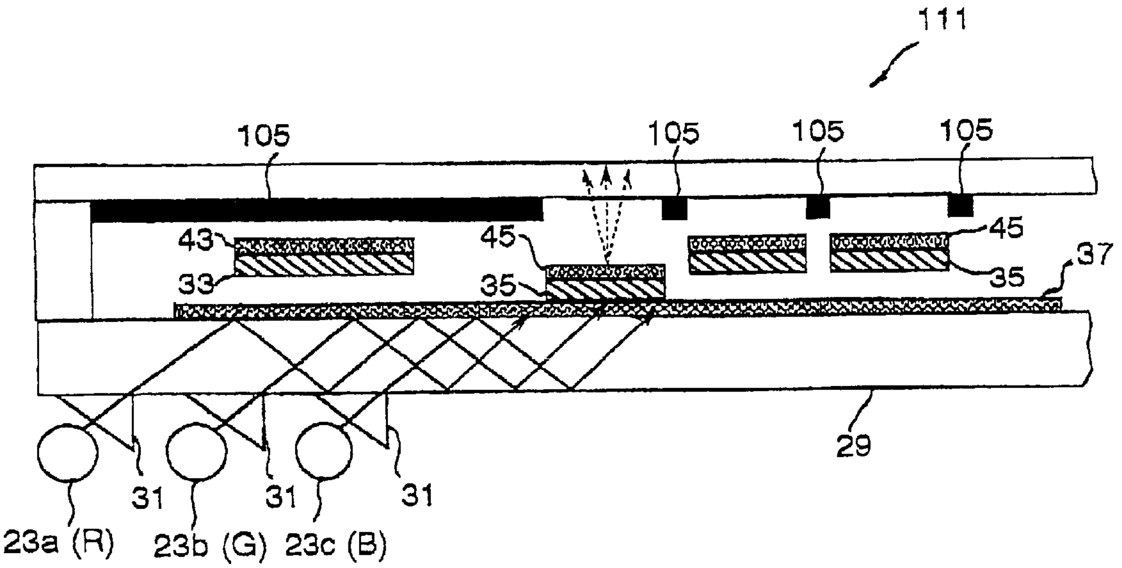
FIG. 12 is an enlarged view of a portion including an electromechanically deflectable main thin-film of a panel display device in accordance with still another embodiment of the present invention.

FIG. 12 shows a panel display device, which is depicted in cross-section taken in a direction perpendicular to subsidiary thin-films, in accordance still another preferred embodiment of the present invention. The panel display device equipped with a light modulating element array 111 has a plurality of, for example three in this embodiment, fluorescent lamps 23*a*, 23*b* and 23*c*, namely red, green and blue fluorescent lamps, which are excited independently from one another to emit red, green and blue fluorescence, respectively.

According to the panel display device, the light modulating element array 111 provides three different colors of light at each light path deflection point 53 by exciting the three fluorescent lamps 23*a*, 23*b* and 23*c*, independently. This avoids installation of three different fluorescent layers 93 like the light modulating element array 91 shown in FIG. 10 or three different color filter layers 103 like the light modulating element array 101 shown in FIG. 11, which results in a simple structure of the light modulating element array 111.

Figure 13:
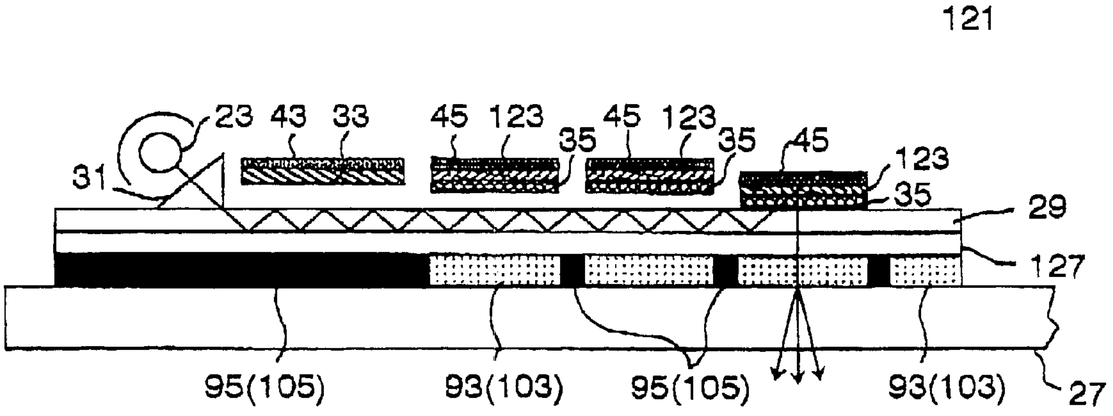
FIG. 13 is an enlarged view of a portion including an electromechanically deflectable main thin-film of a panel display device in accordance with a further embodiment of the present invention.
Figure 14:
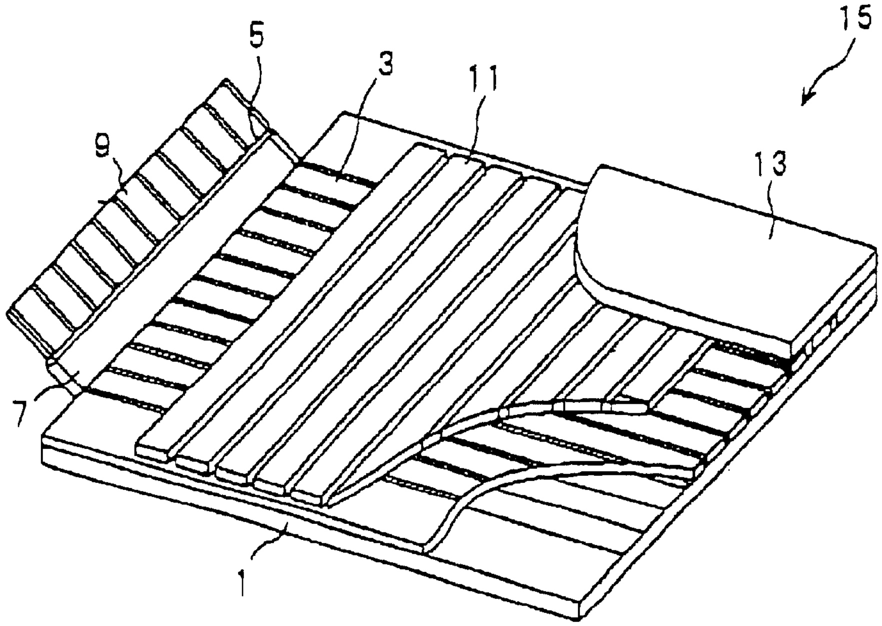
FIG. 14 PRIOR ART
FIG. 14 is a perspective view of a conventional panel display device partly broken.
Figure 15:
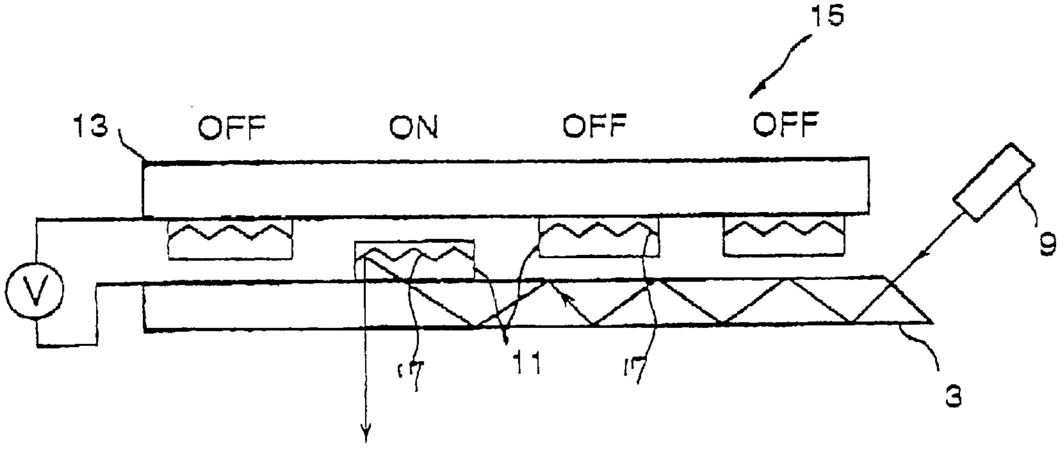
FIG. 15 PRIOR ART
FIG. 15 is an enlarged cross-sectional view of the conventional panel display device.

FIG. 13 shows a panel display device, which is depicted in cross-section taken in a direction perpendicular to subsidiary thin-films, in accordance a further preferred embodiment of the present invention. The panel display device comprises, as a predominant component, a light modulating element array 121 provided on a transparent base substrate 27 such as a glass plate and a light source 23. The light modulating element array 121 comprises a plurality of strip-shaped light guides 29 formed in parallel to one another on a fluorescent layer 93 (which will be described later) formed on the base substrate 27, one strip-shaped electromechanically deflectable main thin-film 33 which is suspended on one side of the light guide 29 opposite to the side on which the fluorescent layer is formed so as to spatially overlap each light guide 29, and a plurality of strip-shaped, electromechanically deflectable subsidiary thin-films 35 which are suspended on the same side of the light guide 29 as the main thin-films 33 and arranged in parallel to one another so as to spatially intersect the light guides 29. The main thin-film 33 is accompanied by a transparent electrode 43 formed at one of opposite sides thereof which is remote from the light guide 29. The subsidiary thin-film 35 is accompanied by a transparent electrode 45 and a reflective layer 123 between the subsidiary thin-film and the electrode 45 which are at one of opposite sides thereof which is remote from the light guide 29. The reflective layer 123 is formed so as to reflect back light coming out of the subsidiary thin-film 35 and cause the light to enter the subsidiary thin-film 35 at a right angle. The light modulating element array 121 is preferably provided with a smoothing interlayer 127 between the light guide 29 and the fluorescent layer 93.

The fluorescent layer 93 is divided into a plurality of strips by a black masking 95 such that each strip-shaped fluorescent layer 93 spatially overlap the entire length of the subsidiary thin-film 35. Each adjacent fluorescent layers 93 are optically separated and shielded from each other by the black masking 95. The light modulating element array 121 at the side where the fluorescent layer 95 I formed is covered by a transparent face plate 127.

In operation of the light modulating element array 121, light emanating from the light source 23 and entering the light guide travels in the light guide 29 repeating total reflection. When one of the subsidiary thin-film 35 is electromechanically deflected to brought into contact with the light guide 29, the light traveled to a point where the subsidiary thin-film 35 is in contact with the light guide 29 enters the subsidiary thin-film 35 and then reflected back by the reflective layer 123. The light enters and passes through the light guide 29 and the base plate 27, so as to excite the fluorescent layer 93. As a result, the fluorescent layer 93 emits fluorescence at a point where the subsidiary thin-film 35 is in contact with the light guide 29. The fluorescent layer 39 may be replaced with a color filtering layer 103.

This light modulating element array 121 avoids a step of precisely positioning the fluorescent layers 93 or the color filters 103 with respect to the light guides 29 which is essential to a light modulating element array that has the fluorescent layers or the color filters separately provided from the light guides.

The light modulating element array as described above in connection with the any embodiment can be used as an exposure device.

It is to be understood that although the present invention has been described in detail with respect to the preferred embodiments thereof, various other embodiments and variants may occur to those skilled in the art which are within the scope and spirit of the invention, and such other embodiments and variants are intended to be covered by the following claims.

What is claimed is:

1. A light modulating element array comprising:

a plurality of strip-shaped light guide means for guiding light entering there so that said light travels in said light guide means repeating total reflection at interfaces of the light guide means;

a plurality of electromechanically deflectable strip-shaped main thin-films disposed in parallel to one another, each said main thin-film being suspended at a specified regular distance from said interface of said light guide means so as to spatially overlap an end portion of said light guide means and being electromechanically deflected to be brought close to said interface of said light guide means so as to change a transmission rate of light traveling in said light guide means;

a plurality of electromechanically deflectable strip-shaped subsidiary thin-films disposed in parallel to one another, each said subsidiary thin-film being suspended at a specified regular distance from said interface of said light guide means so as to spatially intersect said light guide means downstream from said main thin-film in a direction in which light travels in said light guide means and electromechanically deflected to be brought into contact with said interface of said light guide means so as to deflect a path of light from said light guide means to said subsidiary thin-film.

2. A light modulating element array as defined in claim 1, wherein each of said main thin-film and said subsidiary thin-film is brought close to said light guide means by electrostatic force generated between said light guide means and said each of said main thin-film and said subsidiary thin-film.

3. A light modulating element array as defined in claim 1, wherein each of said main thin-film, said subsidiary thin-film and said light guide means is provided with a transparent electrode so that said electrostatic force is generated when there is provided a potential difference between said transparent electrode of said each of said main thin-film and said subsidiary thin-film and said transparent electrode of said light guide means.

4. A light modulating element array as defined in claim 1, and further comprising light absorbing means for absorbing light incident thereon, said light absorbing means being provided on said main thin-film.

5. A light modulating element array as defined in claim 1, and further comprising light reflective means for reflecting light incident thereon, said light reflective means being provided on said main thin-film.

6. A light modulating element array as defined in claim 1, wherein a plurality of said main thin-films are disposed facing the light guide means at said specified distance from the interface and arranged in said direction, said main thin-films being independently actuated such that one or more of said main thin films are selectively brought close to said interface of said light guide means so as to change said transmission rate of light traveling in said light guide means in steps.

7. A light modulating element array as defined in claim 1, and further comprising fluorescent means for producing fluorescence when exited, said fluorescent means being disposed facing said subsidiary thin-film so as to be excited by light coming out of said subsidiary thin-film.

8. A light modulating element array as defined in claim 1, and further comprising color filter for transmitting a specific color of light, said color filtering means being disposed facing said subsidiary thin-film so as to selectively transmit said specific color of light coming out of said subsidiary thin-film.

9. A light modulating element array as defined in claim 1, and further comprising a reflective means for reflecting light incident thereon, said light reflective means being provided on said subsidiary thin-film so as to reflect light coming out of said light guide means back to said light guide means.

10. A light modulating element array as defined in claim 1, wherein said light guide means comprises an optical waveguide.

11. A light modulating element array as defined in claim 1, wherein said light guide means comprises an optical light guide plate.

12. A light modulating element array as defined in claim 1, and further comprising light source means for emitting said light, said light source means being disposed in a specified position relative to the light guide so that said light entering said light guide means impinges said interface of said light guide means at an angle greater than a critical angle of total reflection, thereby using said light modulating element array as a panel display device.

13. A light modulating element array as defined in claim 12, wherein said light source means comprises a line source element.

14. A light modulating element array as defined claim 12, wherein said light source means comprises a plurality of light source elements that are independently turned on and off and emit different wavelengths of light, respectively.

15. A method of driving a light modulating element array comprising a parallel arrangement of light guide means for guiding light entering there so that said light travels in said light guide means, a parallel arrangement of electromechanically deflectable strip-shaped main thin-films disposed above said the light guide means at a specified regular distance from said light guide means, and a parallel arrangement of electromechanically deflectable strip-shaped subsidiary thin-films disposed perpendicularly to said light guide means at a specified regular distance from said light guide means downstream from said main thin-films, said method of driving said light modulating element array comprising the steps of:

selectively electromechanically deflecting said subsidiary thin-films so as to bring one of said subsidiary thin-films into contact with said light guide means; thereby deflecting a path of said light from said light guide means to said subsidiary thin-film; and electromechanically deflecting said main thin-films with image signals so as to bring said main thin-films close to said light guide means in synchronism with deflecting said one subsidiary thin-film, thereby changing a transmission of said light traveling in said light guide means.

* * * * *